United States Patent [19]

Mortenson

[11] 4,078,676

[45] Mar. 14, 1978

[54] SELF STORING LIFT GATE ASSEMBLY

[75] Inventor: Carl N. Mortenson, Midland, Mich.

[73] Assignee: Magline, Inc., Pinconning, Mich.

[21] Appl. No.: 740,378

[22] Filed: Nov. 10, 1976

[51] Int. Cl.² .............................................. B60P 1/26
[52] U.S. Cl. .......................... 214/77 P; 214/DIG. 10
[58] Field of Search ................. 214/75 T, 77 R, 77 P, 214/DIG. 10; 296/57 R

[56] References Cited

U.S. PATENT DOCUMENTS

| 3,138,270 | 6/1964 | McCarty | 214/77 P |
|---|---|---|---|
| 3,369,679 | 2/1968 | Robinson | 214/77 P |
| 3,429,464 | 2/1969 | Robinson | 214/77 P |
| 3,498,481 | 3/1970 | Size | 214/77 P |
| 3,587,883 | 6/1971 | Neely, Jr. | 214/77 P X |
| 3,666,121 | 5/1972 | Denner et al. | 214/77 P |
| 4,005,788 | 2/1977 | Ratliff | 214/77 P |

Primary Examiner—L. J. Paperner

Attorney, Agent, or Firm—Learman & McCulloch

[57] ABSTRACT

A self-storing lift gate assembly for trucks or the like in which a lift platform may be selectively located in an operative load lifting relationship upon a power driven lift linkage or in a compact folded stored position upon the linkage. The platform is so arranged that, when stored, the lift linkage underlies and supports the platform and releasable latch means are engaged between the platform and the assembly frame to retain the platform and linkage in the stored position. The latch means includes one or more pins on the platform which, when the platform is in its operative load lifting relationship relative to the linkage, engage a bed extension plate to establish the upper limit of movement of the platform and to restrain the platform against transverse movement relative to the frame, such as might be encountered during transferring articles between the platform and the load carrying bed of the truck.

8 Claims, 9 Drawing Figures

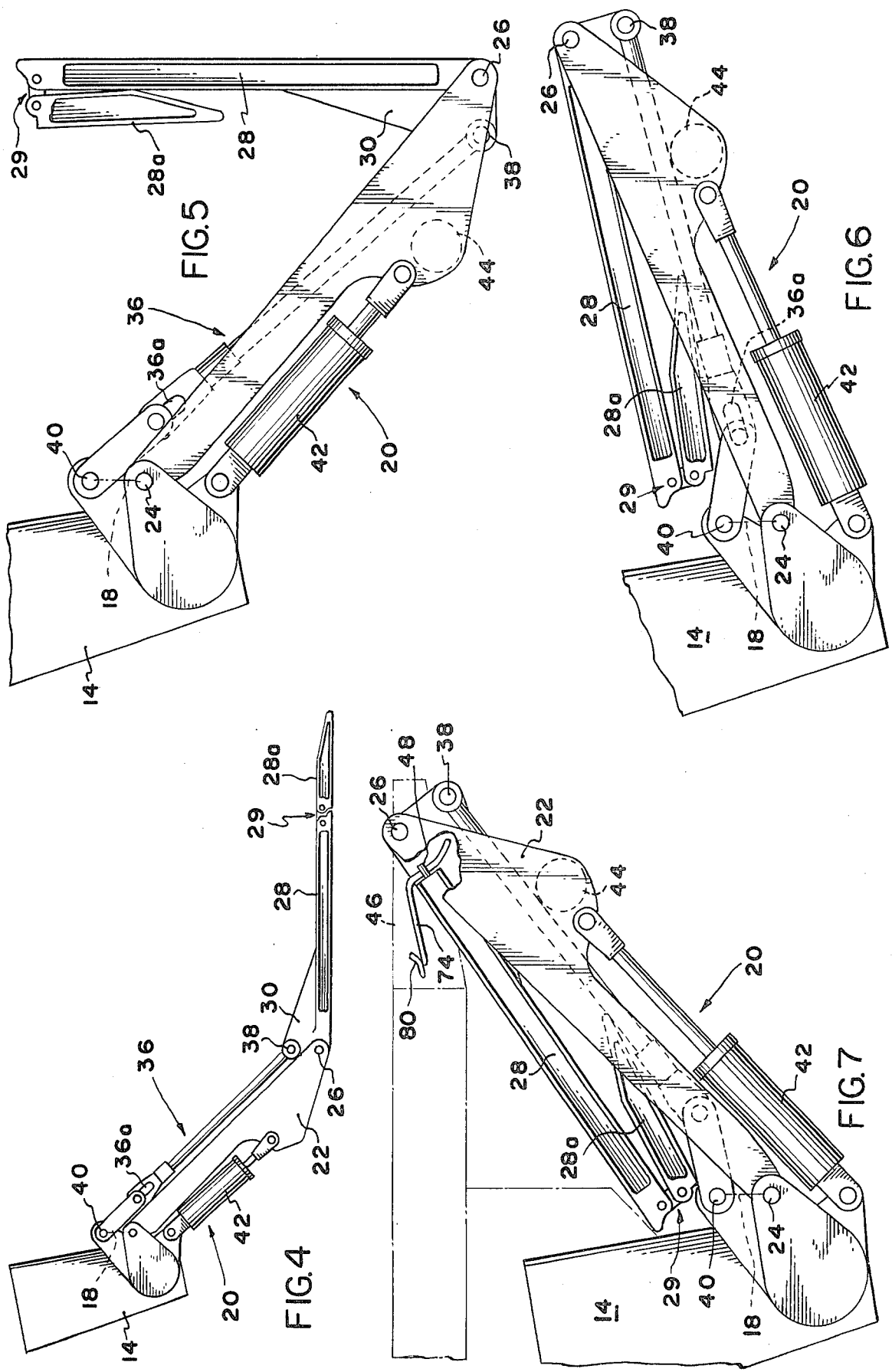

SELF STORING LIFT GATE ASSEMBLY

BACKGROUND OF THE INVENTION

Self-storing lift gates of the general type with which the present invention is concerned, are known in the art, see for example McCarty U.S. Pat. No. 3,138,270, for example. Other patents showing lift gate assemblies of the general type with which the present invention is concerned are Robinson U.S. Pat. Nos. 3,429,464, Novotney 3,172,549, and Lugash 3,269,567, and others. In general, lift gates of this type include a pair of like parallelogram linkages having a relatively short fixed link on the frame and a second relatively short link which is mounted on the load lifting platform with two relatively long links, normally referred to as a compression link and a tension link, coupling the fixed frame link to the platform link. In the usual case, the tension link is provided with some sort of lost motion mechanism so that the platform link may be shifted to one or the other side of an over center position relative to the long links. When the platform is in one relationship to the linkage, the platform remains horizontal throughout the range of power driven movement of the parallelogram linkage to transfer loads between ground level and the level of the vehicle bed. When the platform is shifted manually into the opposite over center relationship, raising of the parallelogram linkage causes the platform to be folded into a compact generally parallel relationship with the long links of the linkage into a stored position underneath the truck bed.

In the usual case, to accommodate the shifting of the platform link to opposite sides of its respective over center relationship, the platform is so dimensioned as to pass freely between the pair of linkage assemblies and thus, when in its stored position, the platform is frequently supported only at the pivotal connections to the two long links of each pair with the platform cantilevered out from this point of support. The bouncing of the truck as it travels over uneven road surfaces causes the freely cantilevered platform to exert substantial impact forces on its pivotal mounting, with attendant rattling.

The present invention is especially designed to provide a lift gate of the general type described above in which the linkage is so arranged as to lie in underlying supporting reationship to the platform when the platform is in its stored position to fully support the platform assembly and to minimize rattling and the accompanying jarring road shock impacts on the lift linkage. Further, the present invention provides a novel latching mechanism which is operable to automatically latch the assembly in its stored position. While this problem has been recognized to some extent — note the safety chain provided by McCarty 3,138,270, for example, the operator frequently forgets to attach the safety chains or may attach the chain only at one side of the assembly. The hydraulic system alone will not hold the assembly in the stored position because as a practical matter seepage or leakage within the hydraulic system is nearly always present.

SUMMARY OF THE INVENTION

In the lift gate assembly of the present invention a pair of hydraulically powered parallelogram linkages are mounted upon a lift gate frame and support a lift platform. At the forward end of the platform, and each of the opposite sides of the platform, an upwardly projecting bracket rigidly secured to the platform is formed with a vertical slot into which the end of the tension link of the parallelogram linkage projects to be pivotally coupled to the platform to operate in a general plane which is spaced inwardly from the side of the platform. The compression link of each of the linkages is pivotally connected to the platform at its outer side edge below the bracket to operate in a general vertical plane which is spaced outwardly from the side of the platform. The tension link, however, operates in a general vertical plane which is located inboard of the side edge of the platform, the slot in the bracket accommodating movement of the tension link so that, when the platform is moved to its stored position, the tension link underlies the platform to provide a positive underlying support for the platform.

A pair of forwardly projecting pins are mounted on the platform and project forwardly from the front edge of the platform. When the platform is used in normal operation, raising of the linkage to elevate the platform to the level of the truck bed projects the pins into a pair of rearwardly facing slots in a truck bed extension plate to establish the upper limit of the platform at the level of the truck bed. The slots further engage the pins, when the platform is in its fully elevated position, to prevent transverse or sidewise sway of the platform frequently encountered in transferring loads to and from the platform.

To store the platform, the lift linkage is shifted to its lowered position and the platform is manually swung upwardly through 90° to a generally vertical position while the linkage is in its fully lowered position. This action shifts the tension link-platform pivots into an over center relationship so that subsequent raising of the linkage continues to swing the platform in the same direction generally toward a generally parallel overlying relationship with the downward folding tension links. As the linkage, with the downwardly folded platform, approaches its fully elevated position, the pins on the forward edge of the platform engaged spring cliplike members on the under side of the bed extension plate, and as the linkage reaches its fully raised position, the pins slip into bores in the spring clips to latch the assembly in its fully stored position.

The platform may be provided with a transversely hinged extension plate which during the storage movement finds its trailing edge engaged by the tension link which folds the extension under the main body of the platform as the linkage move to the stored position.

An actuating shaft extending fully through the bed extension plate from one side to the other can be manually actuated to release the pins from the spring clip bores when it is desired to release the assembly from its stored position.

Other objects and features of the invention will become apparent by reference to the following specification and to the drawings.

IN THE DRAWINGS

Figure 8:
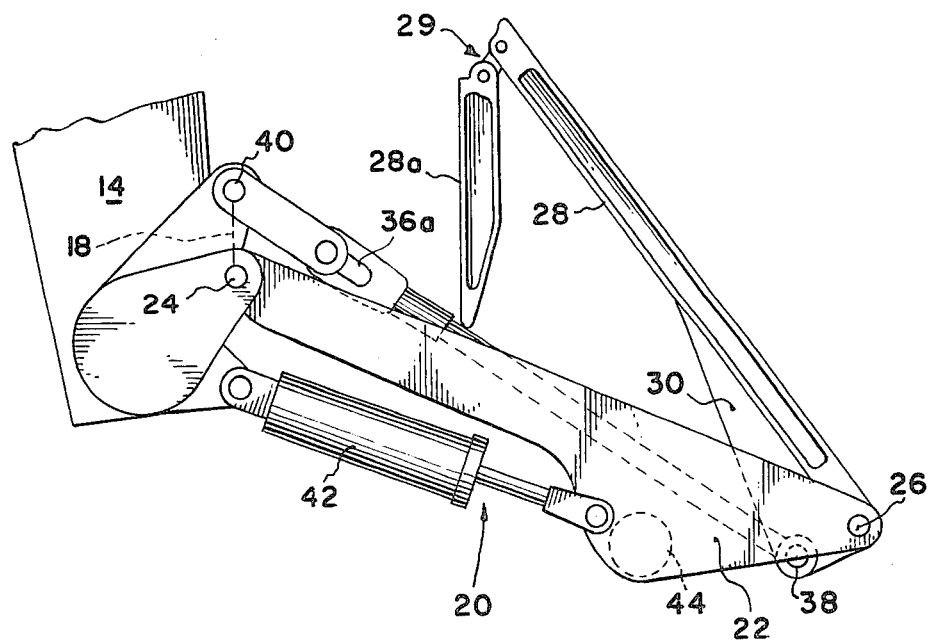
Figure 9:
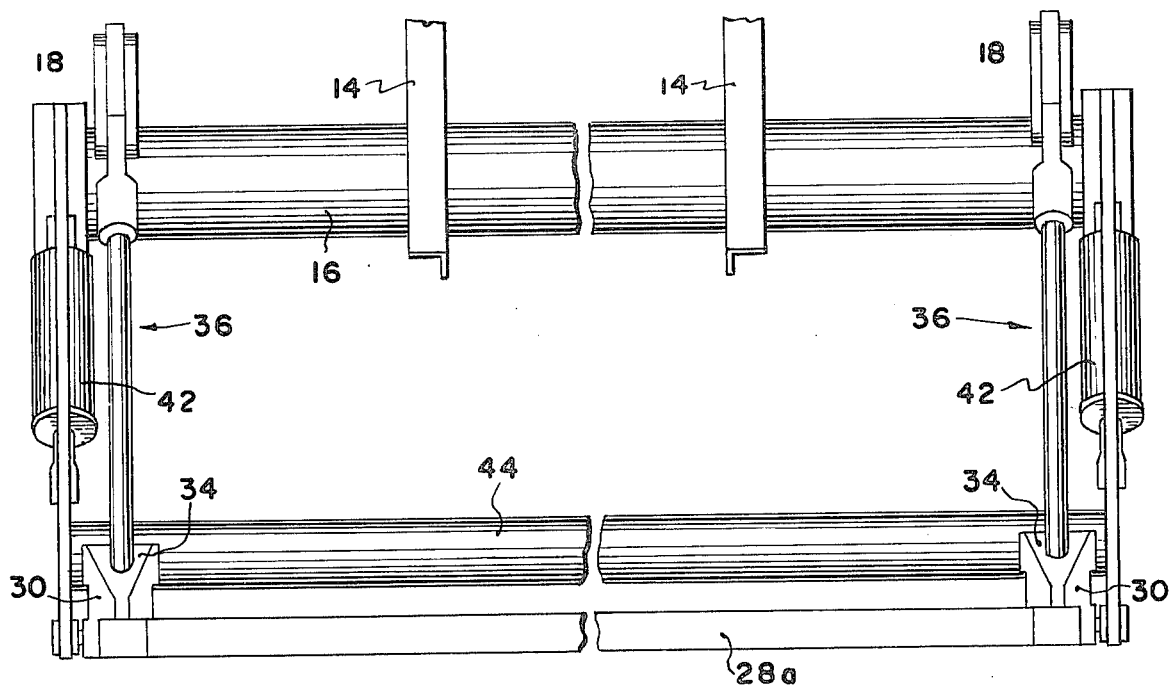

FIGS. 4, 5, 6, and 7 are side elevational views showing the sequence of movement of the assembly between its lowered operative position and its stored position;

FIG. 8 is a view similar to FIGS. 4 – 7 showing the linkage at an intermediate position; and FIG. 9 is a rear view of the assembly with the platform in its lowered position.

Figure 1:
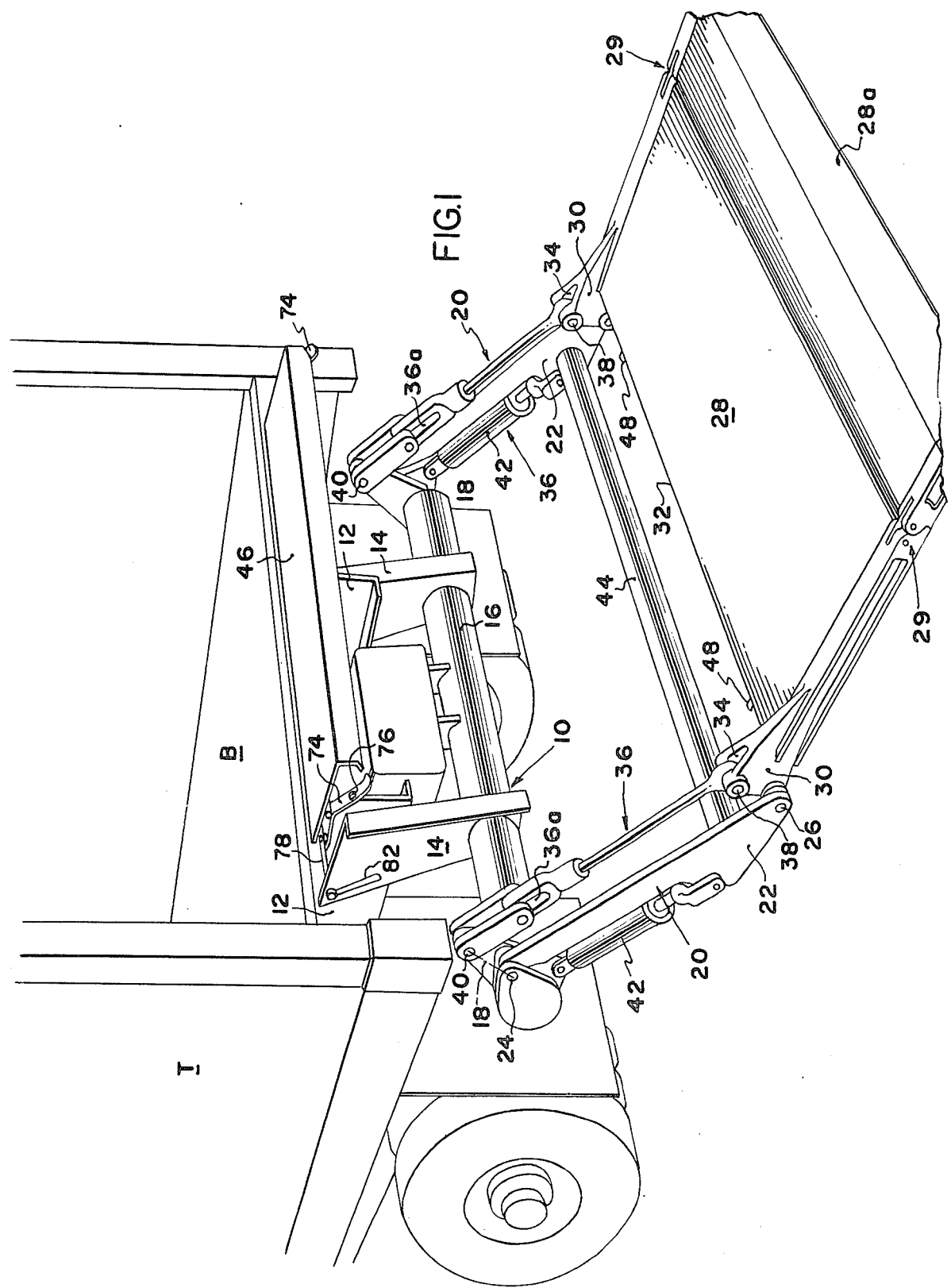
FIG. 1 is a perspective view of a lift gate assembly embodying the present invention.

Referring first to FIG. 1, a lift gate assembly embodying the present invention includes a fixed frame designated generally 10 which is designed to be fixedly mounted upon the frame 12 of a truck T or other load carrying vehicle at the rear of the load carrying bed B. Frame 10 includes a pair of relatively heavy transversely spaced vertical webs 14 which are fixedly secured at their upper ends to the truck frame to suspend and fixedly support a horizontal transversely extending torque tube 16. At the opposite ends of tube 16, a pair of fixed links 18 are fixedly secured to the tube to respectively constitute the fixed links of what will be referred to as four bar parallelogram linkages designated generally 20.

The linkages 20 at opposite ends of torque tube 16 are of similar construction, and a detaailed description of one is equally applicable to the other. In brief, each linkage 20 includes the fixed link 18 and a compression link 22 pivotally connected at one end as at 24 to the lower end of link 18 and pivotally connected at its opposite end as at 26 to a load supporting platform 28 of the assembly. As best seen in FIG. 1, pivot 26 projects outwardly from one side edge of the platform 28 and compression link 22 thus operates in a vertical general plane which is spaced outwardly clear of the adjacent side edge of platform 28. Platform 28 may include an extension plate 28a, hingedly connected to platform 28 as at 29 in a manner such that plate 28A cannot swing in a clockwise direction relative to platform 28 beyond the horizontally extended relationship shown in full line in FIG. 4, but is free to pivot in a counterclockwise relationship from the FIG. 4 position into the face-to-face relationship shown in broken line in FIG. 4.

A generally triangular mounting bracket 30 is formed on or fixedly secured to platform 28 at each of the opposite ends of its forward edge 32. Bracket 20 projects upwardly from the upper surface of platform 28 and is formed with a link receiving slot 34 into which one end of a tension link assembly 36 projects and is pivotally connected by pivot 38. Tension link assembly 36 is pivotally coupled to fixed link 18 by a pivot pin 40 and constitutes a third link of a parallelogram linkage, while that portion of bracket 30 between pivots 38 and 26 constitutes the fourth link of the "four bar" linkage.

During normal operation of the lift gate assembly in raising and lowering loads on platform 28 between ground level and the level of the truck bed, tension link assemblies 36 are always in tension and function in this mode solely as rigid links. Hydraulic motors designated generally 42 supplied by fluid pressure from a suitable source and controlled by conventional valving arrangement, not shown, but completely conventional and well-known to persons skilled in this art, are employed to drive the linkages in the normal raising and lowering movement. The assembly is provided with a cross brace member 44 rigidly connected between the two compression links.

The lift gate frame 10 further includes a generally horizontal truck bed extension plate 46 which may either be mounted on frame 10 or may be independently mounted directly to the truck bed as by welding.

Extension plate 46 forms a fixed rearward extension of the load carrying bed of the truck to partially shield the lift gate linkage when in its stored position and to serve as a mounting member for a latching mechanism to be described below and as an aligning member cooperable with platform 28 when in its raised position.

Figure 2:
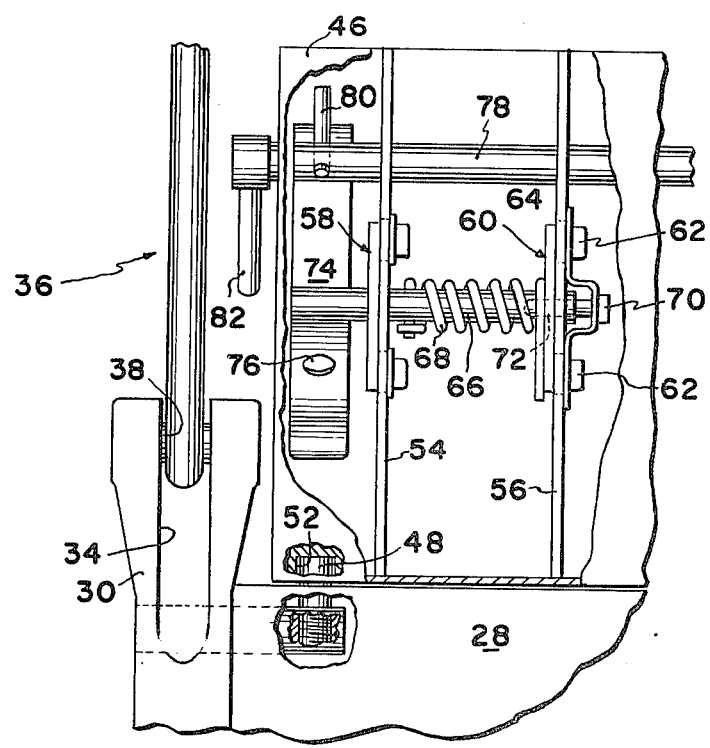
FIG. 2 is a detail top plan view, with certain parts broken away or shown in section, showing details of the storage latch assembly.
Figure 3:
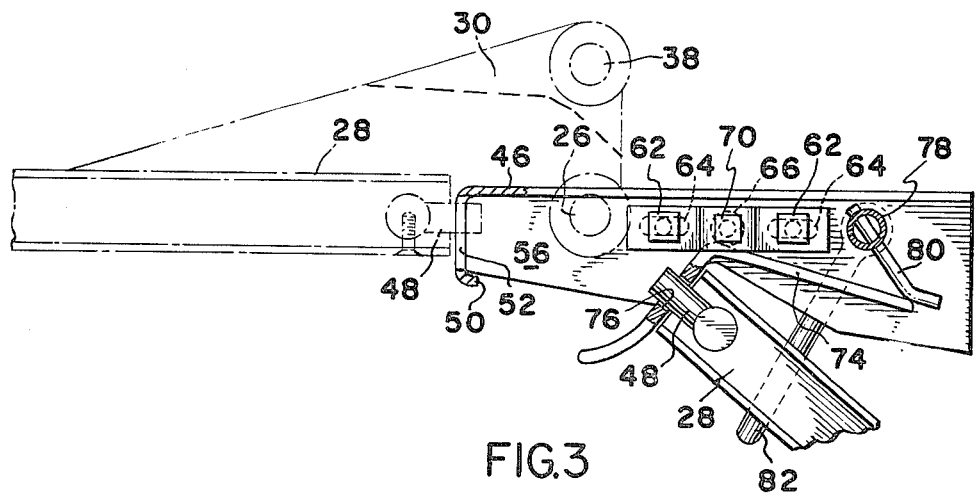
FIG. 3 is a detail side elevational view, with certain parts broken away or shown in section of the assembly shown in FIG. 2.

As best seen in FIGS. 2 and 3, platform 28 has a pair of fixedly mounted forwardly projecting pins 48 located at the front edge of the platform adjacent each side of the platform. A downwardly turned flange 50 at the rearward edge of extension plate 46 is formed with elongate slots such as 52 (FIG. 3) into which pins 48 project when the platform 28 is at its elevated position, shown in broken line in FIG. 3. When received within slots 52, pins 48 function to prevent further upward movement of platform 28, thereby establishing its upper limit of movement, while at the same time the pins prevent any transverse sway of platform 28 (left to right as viewed in FIG. 2) relative to the stationary extension plate 46.

To latch the linkage and platform in their stored position, a latch assembly best shown in FIGS. 2 and 3 is mounted on the underside of extension plate 46. A pair of spaced frame members 54 and 56 are fixedly secured, as by welding, to the underside of extension plate 46 near each end of the plate. Each of plates 54 and 56 supports a mounting bracket assembly, 58 and 60 respectively, which is clamped to members 54 and 56 for adjustment longitudinally along frame members 54, 56 as by mounting bolts 62 which pass through elongated openings 64 in the respective frame members. Brackets 58 and 60 rotatively support a latch shaft 66 which is rotatively biased in a counterclockwise direction as viewed in FIG. 3 by a torsion spring 68 (FIG. 2). An adjustment bolt 70 rotatively mounted on bracket assembly 60 is received within a threaded bore 72 (FIG. 2) in shaft 66 so that shaft 66 may be adjustably positioned in an axial direction (left to right as viewed in FIG. 2) by rotation of the adjustment bolt.

A latch member 74 is fixedly mounted upon shaft 66, as by welding, and a pin receiving bore 76 is drilled through member 74 to receive pin 48, as shown in FIG. 3, when the linkage and platform are moved to their stored position.

To release the pin 48 from opening 76, a rotary shaft 78 is journaled in frame members 54 and 56 of extension plate 46 and a latch actuator arm 80 is fixedly secured to shaft 78. Handles 82 are provided at the opposite ends of shaft 78 for manually rotating shaft 78 from either side of the device (only the handle 82 at the lefthand side of the device appears in the drawings, however, a similar handle is provided at the opposite end of shaft 78). With reference to FIG. 3, it is seen that if handle 82 is manipulated to rotate shaft 78 in a clockwise direction as viewed in FIG. 3, arm 80 will press downwardly on the right hand end of latch member 74, thus causing latch member 74 to rotate in a clockwise direction viewed in FIG. 3 about the axis of shaft 66, against the action of torsion spring 68. This clockwise rotation of latch member 74 swings the left hand end of the latch member outwardly beyond the outer end of pin 48, thus releasing the latched relationship shown in FIG. 3.

The overall operation of the lift gate is as follows. Referring first to FIG. 1, the assembly is shown in its normal operating position with platform 28 disposed in a horizontal position and in what will be referred to as an operative relationship with the lift gate linkage. As shown in FIG. 1, the platform is resting upon the ground. A load to be placed in the truck bed is then placed upon platform 28 and the hydraulic motors 42 of the assembly are actuated, in well-known manner, to extend their piston rods, thus causing the linkage to rotate upwardly from the position shown in FIG. 1 until the forward edge of platform 28 is in abutting relationship with the rearward edge of extension plate 46, as shown in broken line in FIG. 3. The load is then transferred from platform 28 into the interior of the truck bed. As described above, when the platform 28 moves into abutting relationship with the rearward edge of extension plate 46, the pins 48 on the platform are received within the slots 52 in plate 46 to prevent further upward movement of the platform and to lock the platform against transverse sway relative to the extension plate. By reversing the foregoing procedure, a load can be lowered from the truck bed to ground level.

To place the assembly in its stored position, the apparatus is first put in the position shown in FIG. 1, see also FIG. 4. Extension plate 28a is manually folded to the broken line position of FIG. 3 and rearward edge of platform 28 is then manually grasped and elevated to the position shown in FIG. 5. During this elevating movement, compression link 22 remains stationary, as do the fixed pivots 24 and 40, while the pivot 38 at one end of the tension link assembly 36 is rotated relative to pivot 26 from a position in approximate vertical alignment with pivot 26 as in FIG. 4 to a position at or slightly below horizontal alignment with pivot 26 as shown in FIG. 5. In order to accommodate this movement of pivot 38, the tension link assembly 36 must be capable of fore-shortening itself, and this capability is provided by a lost motion connection in tension link assembly 36 indicated at 36a.

With parts in the position shown in FIG. 5, to place the device in its stored position, motors 42 are again actuated to extend their piston rods, thus driving compression link 22 in counterclockwise rotation about its fixed pivot 24 upwardly toward the position shown in FIG. 6. During this movement pivot 38 is rotated an additional increment of counterclockwise movement about pivot 26, thus effectively collapsing or folding platform 28 downwardly toward a generally parallel overlying relationship with the tension link assemblies 36.

Tension link assemblies 36 remain in tension during this portion of movement of the linkage because platform 28 and its extension 28a gravitationally bias pivot 38 in counterclockwise pivotal movement relative to pivot 26. As the linkage reaches the position shown in FIG. 8, the trailing edge of the freely hanging platform extension 28a contacts the upper side of tension link assemblies 36 at an acute angle, and further movement of the linkage toward its stored position causes the tension link to fold the extension 28a under platform 28 as the trailing edge of extension 28a slides along the tension link. In FIG. 6, the device is shown as it is approaching its stored position. At this time tension link 36 has moved into contact with cross brace 44 and rests upon the cross brace. This support, combined with the fact that the platform 28 and its extension 28a are now supported on the tension links releases the gravitational bias urging pivot 38 in counterclockwise movement about pivot 26, thus releasing the tension on link 36, which now breaks at the lost motion connection 36a to the position shown in FIG. 6. In FIG. 7 further extension of the piston rod of motor 42 has driven the assembly into its stored position with pin 48 seated in latch member 74.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. In a lift gate for transferring loads between ground level and the level of a load carrying bed of a vehicle, said gate having a gate frame adapted to be mounted on the frame of a vehicle, power driven parallelogram link means mounted on said gate frame for movement between a lowered and a raised position, and a lift platform carried by said link means and shiftable relative to said link means between a first relationship wherein said platform is maintained in a horizontal position during movement of said link means between said lowered and said raised position and a second relationship wherein said platform is moved to a compact stored position relative to said link means upon movement of said link means to said raised position; the improvement wherein said link means comprises a pair of transversely spaced link assemblies coupled to the forward end portion of said platform at opposite side edges thereof, each link assembly, comprising a compression link pivotally coupled to said platform for movement relative to said platform in a general plane disposed outwardly of the side edge of said platform, and a tension link pivotally coupled to said platform for movement in a general plane located inwardly of the side edge of said platform to underlie and support said platform when said platform is in said stored position.

2. The invention defined in claim 1 wherein the pivotal connection between said tension link and said platform is located above the pivotal connection between the compression link and said platform when said platform is in said first relationship to said link means and the tension link-platform pivotal connection is located below the compression link-platform pivotal connection when said platform is in said second relationship to said link means.

3. The invention defined in claim 1 further comprising a bracket fixedly mounted on said platform and projecting upwardly from the upper surface of said platform, said bracket having an elongate slot in the upper portion thereof receiving one end of said tension link, and pivot pin means pivotally coupling said tension link to said bracket, said slot receiving a portion of said tension link when said platform is in said stored position.

4. The invention defined in claim 1 further comprising a cross brace member fixedly mounted upon and extending between the compression links of the pair of link assemblies in underlying relationship to the tension links, said cross brace being located to contact and support said tension links when said platform is in said stored position.

5. The invention defined in claim 1 wherein said platform comprises a main platform and a platform extension plate hingedly mounted at the rearward edge of said platform for pivotal movement between a lift position wherein said platform extension plate constitutes a horizontal rearward extension of said main platform and a folded position wherein said platform extension plate lies in face to face engagement with the top of said main platform.

6. In a lift gate for transferring loads between ground level and the level of a load carrying bed of a vehicle, said gate having a gate frame adapted to be mounted on the frame of a vehicle, power driven parallelogram link means mounted on said gate frame for movement between a lowered and a raised position, and a lift platform carried by said link means and shiftable relative to said link means between a first relationship wherein said platform is maintained in a horizontal position during movement of said link means between said lowered and said raised position and a second relationship wherein said platform is moved to a compact stored position relative to said link means upon movement of said link means to said raised position; the improvement comprising a bed extension plate constituting a rearward extension of the load carrying bed of said vehicle, latch pin means mounted upon and projecting forwardly from the forward edge of said platform, first seating means on said extension plate for receiving said latch pin means when said link means is in said raised position and said platform is in said first relationship thereto to align said platform with said plate, and second seating means on said plate for receiving and releasably retaining said latch pin means when said link means is in said raised position and said platform is in said second relationship thereto to releaseably latch said link means in said raised position.

7. The invention defined in claim 6 wherein said first seating means comprises means defining a slot in said plate engageable with said latch pin means to establish an upper limit of movement of said platform relative to said plate and to restrain said platform against transverse movement relative to said plate.

8. The invention defined in claim 6 wherein said second seating means comprises a spring biased member mounted on said plate and having a latch pin means receiving opening therein, said latch pin means being operable to depress said member as said platform moves to said stored position until said latch pin means enters said opening, and release means for depressing said member to disengage said latch pin means from said opening.

* * * * *